(12) United States Patent
Takahashi et al.

(10) Patent No.: US 7,201,391 B2
(45) Date of Patent: Apr. 10, 2007

(54) FRONT FORK IN TWO-WHEELED VEHICLE OR THE LIKE

(75) Inventors: Hideaki Takahashi, Shizuoka (JP); Toshihide Tachibana, Shizuoka (JP); Yousuke Hasumi, Shizuoka (JP)

(73) Assignee: Showa Corporation, Saitama (JP)

( * ) Notice: Subject to any disclaimer, the term of this patent is extended or adjusted under 35 U.S.C. 154(b) by 131 days.

(21) Appl. No.: 11/156,924

(22) Filed: Jun. 20, 2005

(65) Prior Publication Data

US 2006/0170185 A1   Aug. 3, 2006

(30) Foreign Application Priority Data

Dec. 28, 2004  (JP) ............................. 2004-378930

(51) Int. Cl.
*B62K 25/08* (2006.01)
(52) U.S. Cl. .................................... 280/276; 267/64.26
(58) Field of Classification Search ................ 280/276, 280/277, 279, 275, 283; 180/227; 267/64.26
See application file for complete search history.

(56) References Cited

U.S. PATENT DOCUMENTS 5,725,226 A * 3/1998 Cabrerizo-Pariente ...... 280/276
5,862,895 A * 1/1999 Ricard .......................... 188/289
6,105,988 A * 8/2000 Turner et al. ............... 280/276
6,513,822 B1 * 2/2003 Chonan ....................... 280/276

FOREIGN PATENT DOCUMENTS

JP    SHO 63-160455   10/1988
JP    HEI 4-7386      2/1992

* cited by examiner

*Primary Examiner*—Tony Winner
(74) *Attorney, Agent, or Firm*—Orum & Roth LLC

(57) ABSTRACT

A front fork of a two-wheeled vehicle or the like is disclosed in which an annular free valve is provided between a taper-like valve seat surface formed in an upper surface of a valve seat member fixed to an inner periphery of a lower end portion of an inner tube and a valve stopper so as to be movable upward and downward such that an annular gap is formed with respect to an outer periphery of a hollow pipe. A leaf spring energizing the free valve to the taper-like valve seat surface is provided in an upper side of the free valve, the leaf spring having an annular portion and a plurality of hook portions extending in a radial direction to an inner periphery of the annular portion, and being formed in a flat shape in a free state.

11 Claims, 5 Drawing Sheets

FRONT FORK IN TWO-WHEELED VEHICLE OR THE LIKE

BACKGROUND OF THE INVENTION

1. Field of the Invention

The present invention relates to a valve structure of a front fork in a two-wheeled vehicle or the like.

2. Description of the Related Art

In Japanese Utility Model Publication No. 4-7386 (patent document 1), there is disclosed a valve spring 7 in which a hole 7b inserting a seat pipe 2 thereto is formed in a center portion of a thin plate-like ring body 7a, and three arm portions 7c extending in a diametrical direction are formed in an outer periphery of the ring body 7a, as shown in FIG. 8 of the present application.

As shown in a right half of FIG. 1 in the document, the valve spring 7 is formed such a shape that each of the arm portions 7c in the outer periphery is curved upward, in a state in which a free valve 6 is seated on a taper surface 4b of an oil lock collar 4 or an initial load is applied. Further, it is also formed in a curved shape even in a free state in which the load is not applied.

Further, as shown in a left half of FIG. 1 in the document, the ring body 7a (an annular portion) in an inner periphery is deflected upward such that the free valve 6 is disengaged from the taper surface 4b of the oil lock collar 4, that is, under conditions in which the load is increased. As a result, an outer diameter (shown by reference symbol A in FIG. 8 of the present application) virtually binding leading end portions of the respective arm portions 7c in a circumferential direction is enlarged, and allows the valve spring 7 to become flat.

However, if the valve spring 7 is formed in the curved shape in the free state, there is a problem that durability of the valve spring 7 is not obtained due to a residual stress during working or the like.

Further, in Japanese Unexamined Utility Model Publication No. 63-160455 (patent document 2), there is disclosed a valve spring 7 in which a hole 7a inserting a seat pipe 2 thereto is formed in a center portion by punching a disc-like elastic body, and three oil holes 7b passing a working fluid therethrough are formed, as shown in FIG. 9 of the present application. In other words, as is shown in a right half of FIG. 1 in this document, the valve spring 7 is formed in an approximately flat shape such that the free valve is seated, and in the case that a front fork is compressed from this state, the free valve 6 is moved upward as shown by a left half of FIG. 1 in this publication, and an inner peripheral portion of the valve spring 7 is deflected upward.

However, since a leading end portion in an inner peripheral side of the arm portion 7c in the valve spring 7 is coupled by an inner ring-like portion (shown by reference symbol 7d in FIG. 9 of the present application), there is a problem that the valve spring 7 is difficult to deflect. As a result, there is a problem that a damping force during compression becomes higher and absorbability of a road surface input is deteriorated.

SUMMARY OF THE INVENTION

An object of the present invention is to provide a free valve mechanism which is excellent in durability and in absorbability of a road surface input, in a front fork in a two-wheeled vehicle or the like.

The present invention relates to a front fork in a two-wheeled vehicle. A valve seat member is fixed to an inner periphery of a lower end portion of an inner tube and has a taper-like valve seat surface formed in an upper surface of the valve seat member. An annular free valve is provided between the taper-like valve seat surface and a valve stopper so as to be movable upward and downward wherein an annular gap is formed with respect to an outer periphery of a hollow pipe. A leaf spring energizing the free valve to the taper-like valve seat surface and provided in an upper side of the free valve. The leaf spring is constituted by an annular portion and a plurality of hook portions extending in a radial direction to an inner periphery of the annular portion, and is formed in a flat shape in a free state.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
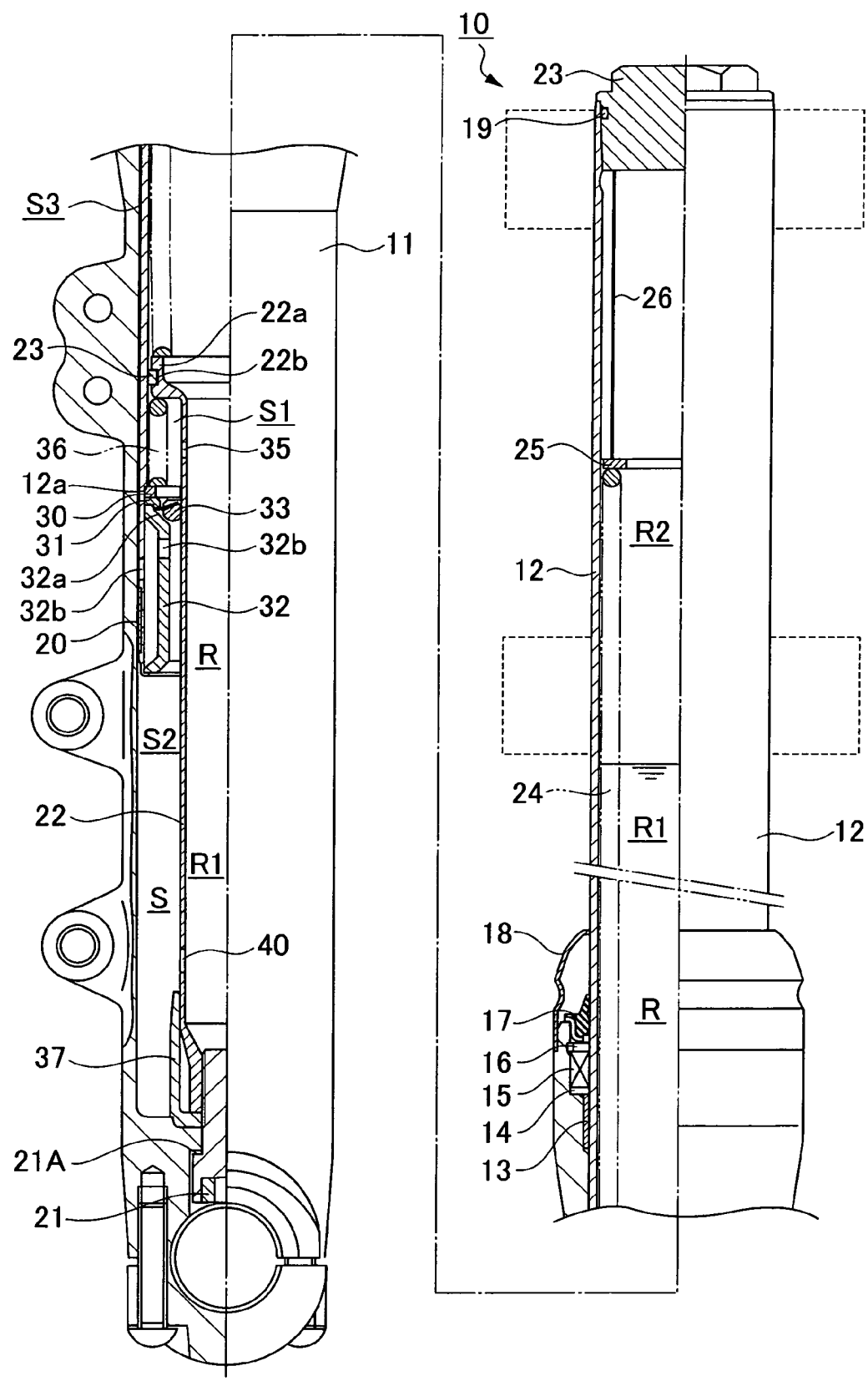
FIG. 1 is an entire cross sectional view showing a front fork in accordance with the present invention in an expanded state.

A front fork 10 is used in a two-wheeled motor vehicle or the like, and is structured, as shown in FIG. 1, such that an inner tube 12 (a vehicle body side tube) in a vehicle body side is slidably inserted to an outer tube 11 (a tire wheel side tube) in a tire wheel side in which one end is closed and the other end is opened. A guide bush 13, a seal spacer 14, an oil seal 15, a stopper ring 16, a dust seal 17 and a cover 18 are provided in an open end of the outer tube 11 to which the inner tube 12 is inserted. A slide bush 20 is provided in an outer peripheral portion of a lower end of the inner tube 12 inserted to the outer tube 11.

A bolt 21 is inserted to a bottom portion of the outer tube 11 via a copper packing 21A, and a hollow pipe 22 fixed by the bolt 21 is provided in a rising manner. The hollow pipe 22 is provided with an expanded portion 22a in an upper end portion, and is brought into slidable contact with an inner periphery of the inner tube 12 via a piston ring 23 fitted and attached to an annular groove 22b in an outer periphery of the expanded portion 22a. The hollow pipe 22 sections an oil chamber S in an outer side, and sections an oil reservoir chamber R constituted by an oil chamber R1 and an upper gas chamber R2 in an inner side thereof.

A cap bolt 23 is screwed with an upper end portion of the inner tube 12 via an O-ring 19. An upper end portion of a suspension spring 24 in which a lower end portion is supported to the expanded portion 22a of the hollow pipe 22 is supported to the cap bolt 23 via a washer 25 and a spring collar 26.

A step portion 12a is formed in an inner periphery of a lower end portion of the inner tube 12. Valve seat members constituted by a valve stopper 30, a spacer 31 and an oil lock collar 32 are systematically brought into contact with the step portion 12a. These elements are fixed by caulking a leading end portion of the inner tube 12.

A taper-like valve seat surface 32a is formed in an upper surface of an inner periphery of the oil lock collar 32. An annular free valve 33 is provided between the valve seat surface 32a and the valve stopper 30 so as to be movable upward and downward such that an annular gap αis formed with respect to an outer periphery of the hollow pipe 22. A leaf spring 41 is provided in an upper surface of the free valve 33, thereby energizing the free valve 33 against the taper-like valve seat surface 32a.

The oil lock collar 32 sections an oil chamber S provided in an outer side of the hollow pipe 22 into an upper oil chamber S1 and a lower oil chamber S2. A plurality of through holes 40 are provided in a lower end portion of the hollow pipe 22, thereby communicating the oil chamber S in the outer side with the oil reservoir chamber R in the inner side. An orifice hole 35 is provided in an upper end portion of the hollow pipe 22, thereby communicating the oil chamber S with the oil reservoir chamber R.

A rebound spring 36 is provided between the valve stopper 30 and the expanded portion 22a formed in the hollow pipe 22, thereby providing buffering during maximum elongation. An oil lock piece 37 is pinched between a lower end portion of the hollow pipe 22 and a bottom portion of the outer tube 11, thereby sealing a working fluid in a lower portion of the oil lock collar 32 of the oil lock collar 32 during maximum compression so as to provide buffering during maximum compression.

A hole 32b is provided in the oil lock collar 32. A hole 12b is provided in a portion of the inner tube 12 in which the oil lock collar 32 is provided. The working fluid in the oil chamber S is supplied to a guide bush 13 of the outer tube 11, a slide bush 20 of the inner tube 12 and a space S3 between the outer tube 11 and the inner tube 12 pinched by the guide bush 13 and the slide bush 20, thereby lubricating the guide bush 13 and compensating a volumetric capacity of the space S3 between both the tubes 11 and 12.

Figure 2:
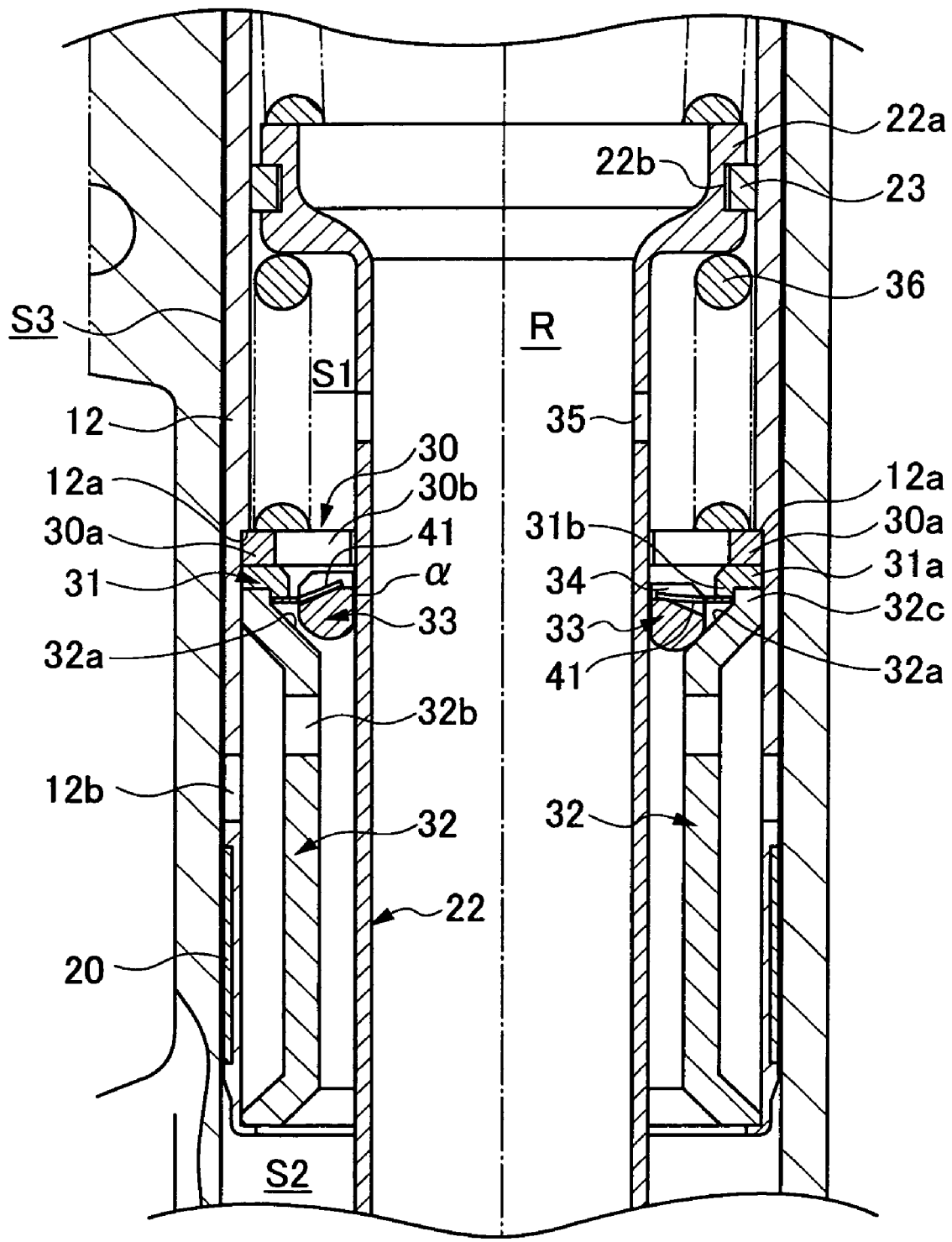
FIG. 2 is a cross sectional view showing a main portion in FIG. 1.

In this case, an annular protrusion portion 32c is formed in an axial direction in an upper end portion of the valve seat surface 32a in the upper surface of the oil lock collar 32, as shown in FIG. 2. The space 31 is pinched between the protrusion portion 32c and the valve stopper 30. The spacer 31 is integrally formed in a collar portion 31a and an inner periphery of the collar portion 31a. A tubular support portion 31b extends to a lower side from the collar portion 31a, holds the collar portion 31a of the spacer 31 between the annular protrusion portion 32c of the oil lock collar 32 and the valve stopper 30. The tubular support portion 31b of the spacer 31 is fitted to an inner periphery of the protrusion portion 32c of the oil lock collar 32. A lower surface of the tubular support portion 31b of the spacer 31 structures a lock surface in a lower surface side of the valve stopper 30.

Figure 5:
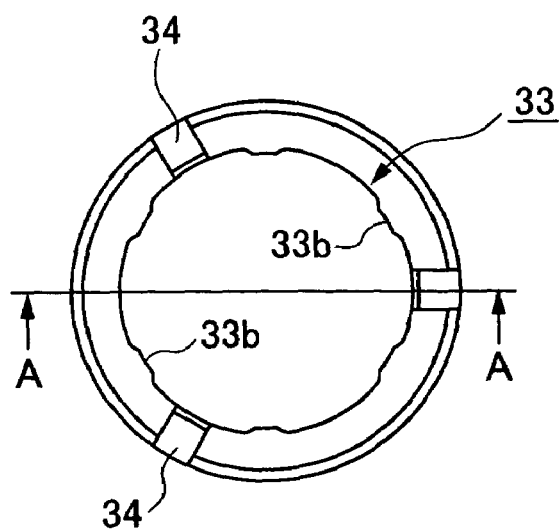
FIG. 5 is a top elevational view of a free valve.
Figure 6:
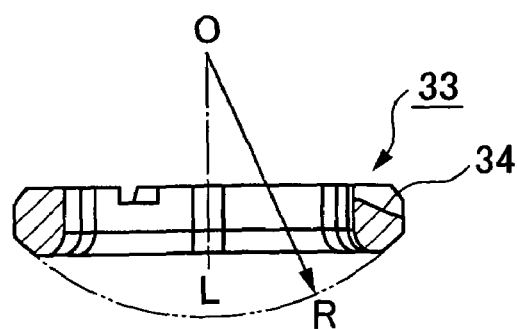
FIG. 6 is a cross sectional view along a line A—A in FIG. 5.

The free valve 33 is constituted by an annular body made of a synthetic resin and is formed in a D-shaped cross section, as shown in FIGS. 5 and 6. A lower surface of the free valve 33 is constituted by a part of a spherical surface R having a center O on a center axis L. Six circular arc protrusion portions 33b are formed at a uniform interval in an inner periphery of the free valve 33, thereby preventing an eccentricity of the free valve 33 with respect to a hollow pipe and keeping the annular gap α formed with respect to the hollow pipe constant so as to prevent a flow rate coefficient from being changed.

Figure 3:
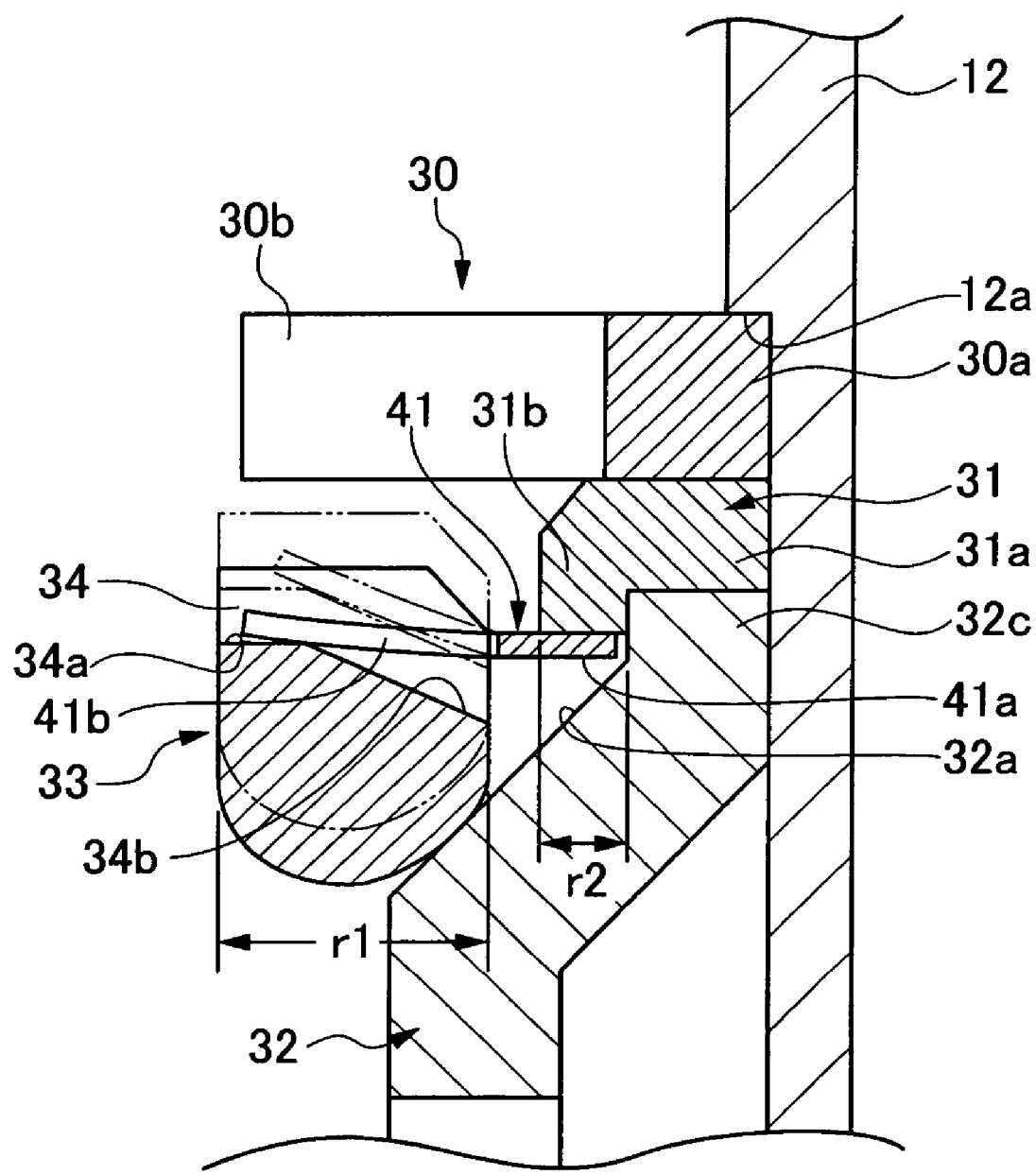
FIG. 3 is an enlarged view of a main portion in FIG. 2.

Three grooves 34 extending in a radial direction in a penetrating manner are formed at a uniform interval in an upper surface of the free valve 33. A bottom portion of the groove 34 is constituted by a flat portion 34a formed in an inner peripheral portion and a slope portion 34b coming down toward an outer periphery from the flat portion 34a, as shown in FIG. 3.

Figure 7:
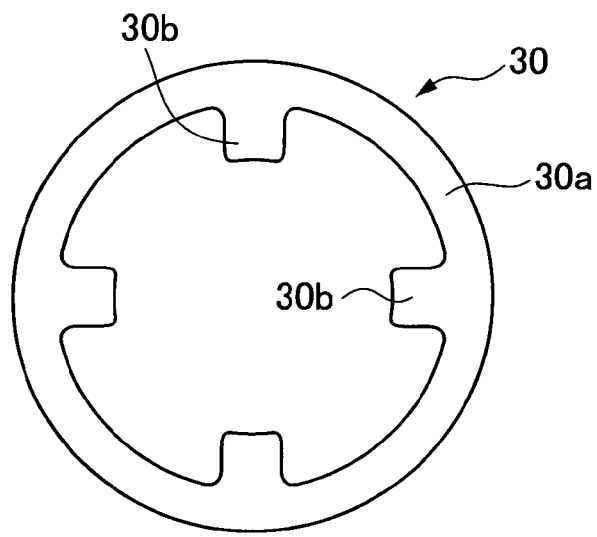
FIG. 7 is a plan view of a valve stopper.
Figure 8:
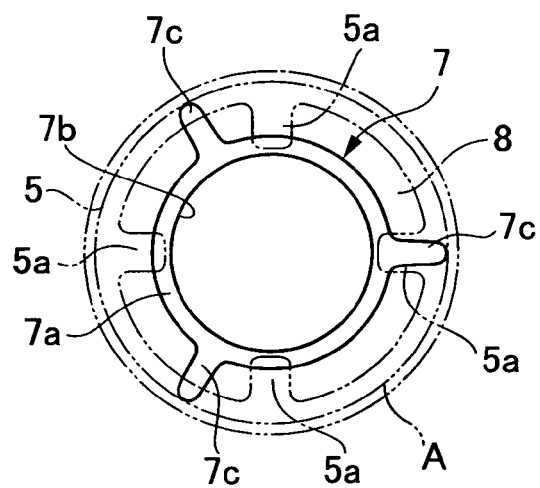
FIG. 8 is a plan view showing a leaf spring in patent document 1.

The valve stopper 30 is constituted by an annular portion 30a and four stopper portions 30b extending in a radial direction in an inner periphery of the annular portion 30a which are formed at a uniform interval, and is formed in a flat plate shape, as shown in FIG. 7. The width of the stopper portion 30b in the valve stopper 30 is formed larger than a width of the groove 34 of the free valve 33.

The stopper portion 30b of the valve stopper 30 inhibits an upward movement of the free valve 33, and forms a flow path of the working fluid between four stopper portions 30b.

Figure 4:
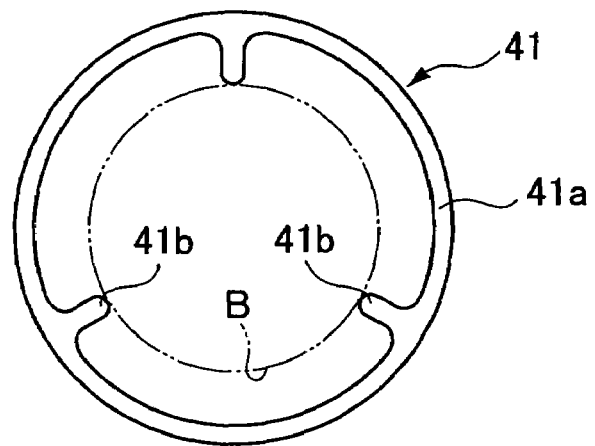
FIG. 4 is a plan view of a leaf spring.
Figure 9:
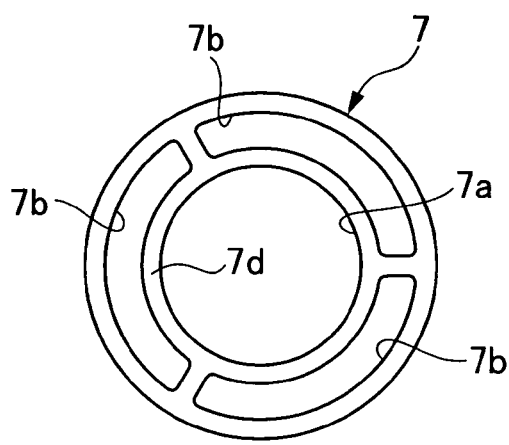
FIG. 9 is a plan view showing a leaf spring in patent document 2.

The leaf spring 41 is constituted by an annular portion 41a and three hook portions 41b extending in a radial direction in an inner periphery of the annular portion 41a, as shown in FIG. 4. Three hook portions 41b are formed at a uniform interval. The leaf spring 41 is formed in a flat shape in a free state, that is, in a state in which no load is applied. A leading end portion of each of the hook portions 41b is separated from each other in a peripheral direction so as to be independently provided. In other words, since an inner peripheral side between the hook portion 41b and the hook portion 41b is open, and the leading end portions of three hook portions 41b are not coupled to an inner side annular portion (shown by reference symbol 7d in FIG. 9) as shown in the patent document 2 in FIG. 9, the leaf spring 41 can be easily deflected.

The annular portion 41a of the leaf spring 41 is locked between a lower surface of the support portion 31b of the spacer 31 and the taper-like valve seat surface 32a formed in the upper surface of the oil lock collar 32, and is fixed in an axial direction, as shown in FIG. 3. Movement in a diametrical direction of the annular portion 41a of the leaf spring 41 is regulated by the inner periphery of the protrusion portion 32c of the oil lock collar 32. However, it is not completely fixed in the axial direction and the diametrical direction, and has a slight gap, in one embodiment about 0.1 to 0.2 mm, in the axial direction and the diametrical direction. The leaf spring 41 can slightly move in the axial direction and the diametrical direction.

Three hook portions 41b of the leaf spring 41 are locked to the bottom portions of three grooves 34 formed in the upper surface of the free valve 33. Since the free valve 33 forms a pressure receiving surface of the working fluid, width r1 in a radial direction thereof is formed larger than a width r2 in a radial direction of the lower surface of the tubular support portion 31b of the spacer 31. As a result, as shown in FIG. 3, it is possible to secure an engagement margin (a contact length) of the inner periphery of the leaf spring 41 with the upper surface of the free valve 33 in three hook portions 41b larger than an engagement margin (a contact length) with the lower surface of the spacer 31. Accordingly, even if the hook portion 41b in the inner periphery of the leaf spring 41 on the basis of the upward movement of the free valve 33 at a time of a compression stroke, and the inner diameter of the leaf spring 41 is contracted, the locking to the upper surface of the free valve 33 is not disengaged. In the case of an external hook, there is a risk that the locking of the external hook is disengaged because the engagement margin with the external hook and the lower surface of the spacer 31 is small.

Further, the leaf spring 41 is locked in a state in which an initial load is applied to a portion between the upper surface of the free valve 33 and the lower surface of the tubular support portion 31b of the spacer 31, that is, the locking surface in the lower surface side of the valve stopper 30.

The hook portion 41b in the inner periphery of the leaf spring 41 is locked to the flat portion 34a as shown in FIG. 3 in an expansion stroke and a resting state, and is locked to the slope portion 34b in the case of upward moving during the compression stroke.

In the front fork 10, an impact applied to the vehicle is absorbed and reduced by the suspension spring 24 and an air spring in the gas chamber R2, and vibration of the suspension spring 24 generated by absorbing the impact is controlled by the following damping effect.

(Compression Stroke)

In a compression stroke of the front fork 10, when the inner tube 12 descends from an expanded state in FIG. 1, pressure in the lower oil chamber S2 in the lower portion of the oil lock collar 32 is increased, and the free valve 33 moves upward while deflecting three hook portions 41b in the inner periphery of the leaf spring 41 so as to open the flow path between the free valve 33 and the taper-like valve seat surface 32a in the upper surface of the oil lock collar 32, as shown by a left half in FIG. 2. The working fluid in the lower oil chamber S2 passes through the flow path between the free valve 33 and the valve seat surface 32a, and passes through the portion between four stoppers 30b of the valve stopper 30 so as to travel to a side of the upper oil chamber S1. Further, the oil having a volume calculated by multiplying the cross sectional area of the inner tube 12 by the stroke moves to the inner side oil reservoir chamber R from the lower oil chamber S2 through the through hole 40 in the lower portion of the hollow pipe 22. The damping force during compression is generated on the basis of a passage resistance when the working fluid passes through the through hole 40.

During maximum compression, the oil lock collar 32 is fitted to the outer periphery of the oil lock piece 37 provided in the outer periphery of the lower end portion of the hollow pipe 22 via the micro gap, thereby sealing the working fluid in the lower portion of the oil lock collar 32 so as to provide buffering during maximum compression.

(Expansion Stroke)

In an expansion stroke of the front fork 10, when the inner tube 12 ascends from a compressed state, the free valve 33 is seated on the valve seat surface 32a in the upper surface of the oil lock collar 32, as shown in a right half in FIG. 2, as a result of the increase of the pressure in the upper oil chamber S1 in the upper portion of the oil lock collar 32, and the energizing force of the leaf spring 41. The oil in the upper oil chamber S1 moves to the lower oil chamber S2 from the annular gap α between the inner periphery of the free valve 33 and the hollow pipe 22. The other working fluid is circulated to the oil reservoir chamber R in the inner side of the hollow pipe 22 via an orifice hole 35 formed in the upper portion of the hollow pipe 22. A damping force is generated on the basis of a passage resistance at a time when the oil in the upper oil chamber S1 passes through the annular gap α in the inner periphery of the free valve 33, and a passage resistance generated in the orifice hole 35 at a time when the oil in the upper oil chamber S1 moves to the oil reservoir chamber R from the orifice hole 35 of the hollow pipe 22.

In this expansion stroke, oil in an amount obtained by multiplying the cross sectional area of the inner tube 12 by the stroke is resupplied from the upper oil reservoir chamber R to the lower oil chamber S2.

In accordance with the present embodiment, the following effects can be obtained.

(a) Since the leaf spring 41 is formed in a flat shape in the free state in which no load is applied, excellent durability can be obtained in comparison with a leaf spring having the deflected shape in the free state as in the prior art.

(b) Since the leading end portions of a plurality of hook portions 41b formed in the inner periphery of the annular portion 41a of the leaf spring 41 are separated from each other in the peripheral direction, the leaf spring 41 can be easily deflected upward from the flat state in the free state.

(c) Since the width r1 (FIG. 3) of the locking surface in the radial direction of the free valve 33 is formed larger than the width r2 of the locking surface in the radial direction in the lower surface side of the valve stopper 30, locking with the free valve 33 is not disengaged even if a plurality of hook portions 41b (the inner hooks) formed in the inner periphery of the annular portion 41a of the flat leaf spring 41 are deflected upward such that the inner diameter (shown by the two-dot chain line B in FIG. 4) virtually binding the leading end portions of a plurality of hook portions 41b is expanded.

(d) Since the collar portion 31a of the spacer 31 in which the tubular support portion 31b is formed in the inner periphery is pinched between the valve stopper 30 and the valve seal member (the oil lock collar) 32, the annular portion 41a of the flat leaf spring 41 is locked to the lower surface of the support portion 31b. A plurality of hook portions 41b are locked to the upper surface of the free valve 33 such that the initial load is applied to the leaf spring 41. It is possible to adjust the initial load of the leaf spring 41 by preparing the spacer 31 in which the length in the axial direction of the tubular support portion 31b is appropriately changed.

(e) Since a plurality of grooves 34 extending in the radial direction are formed in the upper surface of the free valve 33, and a plurality of hook portions 41b of the leaf free valve 41 are locked to the bottom portions of a plurality of grooves 34, the following effects can be obtained.

i) Since the hook portion 41b of the leaf spring 41 received within the groove 34 of the upper surface of the free valve 33 does not come into contact with the lower surface of the valve stopper 30 at a time when the free valve 33 ascends, the leaf spring 41 is not damaged, so that durability is improved.

ii) The free valve 33 and the leaf spring 41 are inhibited from being relatively rotated at a fixed amount or more, by the groove 34, and the leaf spring 41 applies the initial load and is brought into contact with the locking surface in the lower surface side of the spacer 31. Accordingly, the friction force regulates the rotation of the free valve 33 under the influence of the leaf spring 41 and the locking surface in the lower surface side of the spacer 31, so that the rotation of the free valve 33 is regulated and the damping force during compression becomes stable.

(f) Since the bottom portion of the groove 34 of the free valve 33 is constituted by the flat portion 34a formed in the inner peripheral portion of the free valve 33 and the slope portion 34b descending toward the outer periphery from the flat portion 34a, and the hook portion 41b is locked to the flat portion 34a in the expansion stroke and the resting state, the leaf spring 41 can be smoothly deflected along the slope portion 34b. As a result, it is possible to prevent the hook portion 41b of the leaf spring 41 from being broken and it is possible to improve the durability.

(g) Since the valve stopper 30 constituted by the annular portion 30a and a plurality of stopper portions 30b extending in the radial direction in the inner periphery of the annular portion 30a is formed in the flat plate shape, it is possible to reduce working cost of the valve stopper 30.

As mentioned above, in accordance with the present invention, it is possible to improve the durability and the absorbability of the road surface input in the free valve mechanism constituted by the leaf spring, in the front fork in a two-wheeled vehicle or the like.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be encompassed within a scope of equivalents thereof with respect to the features set out in the appended claims.

What is claimed is:

1. A front fork in a two-wheeled vehicle comprising:
   a valve seat member fixed to an inner periphery of a lower end portion of an inner tube and having a taper valve seat surface formed in an upper surface of the valve seat member;
   a valve stopper;
   an annular free valve provided between the taper-valve seat surface and the valve stopper so as to be movable upward and downward forming an annular gap with respect to an outer periphery of a hollow pipe; and a leaf spring energizing the free valve to the taper-valve seat surface and being provided in an upper side of the free valve,
   wherein the leaf spring has an annular portion and a plurality of hook portions extending in a radial direction to an inner periphery of the annular portion, and is formed in a flat shape in a free state.

2. A front fork in a two-wheeled vehicle as claimed in claim 1, wherein the plurality of hook portions are locked to an upper surface of the free valve, and the annular portion is locked to a lower surface side of the valve stopper, and wherein a width of a locking surface in a radial direction of the free valve is formed larger than a width of a locking surface in a radial direction in a lower surface side of the valve stopper.

3. A front fork in a two-wheeled vehicle as claimed in claim 2, wherein a collar portion of a spacer forming a tubular support portion in an inner periphery is pinched between the valve stopper and the valve seat member, an annular portion of the flat leaf spring is locked to a lower surface of the support portion, and the plurality of hook portions are locked to the upper surface of the free valve where an initial load is applied to the leaf spring.

4. A front fork in a two-wheeled vehicle as claimed in claim 1, wherein a plurality of grooves extending in a radial direction are formed in an upper surface of the free valve, and a plurality of hook portions of the leaf spring are locked to bottom portions of the plurality of grooves.

5. A front fork in a two-wheeled vehicle as claimed in claim 2, wherein a plurality of grooves extending in a radial direction are formed in an upper surface of the free valve, and a plurality of hook portions of the leaf spring are locked to bottom portions of the plurality of grooves.

6. A front fork in a two-wheeled vehicle as claimed in claim 3, wherein a plurality of grooves extending in a radial direction are formed in an upper surface of the free valve, and a plurality of hook portions of the leaf spring are locked to bottom portions of the plurality of grooves.

7. A front fork in a two-wheeled vehicle as claimed in claim 4, wherein the bottom portion of the groove of the free valve has a flat portion formed in an inner peripheral portion of the free valve and a slope portion descending toward an outer periphery from the flat portion.

8. A front fork in a two-wheeled vehicle as claimed in claim 5, wherein the bottom portion of the groove of the free valve has a flat portion formed in an inner peripheral portion of the free valve and a slope portion descending toward an outer periphery from the flat portion.

9. A front fork in a two-wheeled vehicle as claimed in claim 6, wherein the bottom portion of the groove of the free valve has a flat portion formed in an inner peripheral portion of the free valve and a slope portion descending toward an outer periphery from the flat portion.

10. A front fork in a two-wheeled vehicle as claimed in claim 3, wherein the valve stopper has an annular portion, and a plurality of stopper portions extending in a radial direction to an inner periphery of the annular portion, and the valve stopper is formed in a flat plate shape.

11. A front fork in a two-wheeled vehicle as claimed in claim 3, wherein a plurality of circular arc-shaped protrusion portions are formed at a uniform interval in an inner periphery of the free valve.

* * * * *